US00RE39404E

(19) United States
(12) Reissued Patent
Megens

(10) Patent Number: US RE39,404 E
(45) Date of Reissued Patent: Nov. 21, 2006

(54) MOVABLE LOADING BRIDGE HAVING AN INFLATABLE FLEXIBLE BODY

(75) Inventor: Johannes H. Megens, Terborg (NL)

(73) Assignee: SPX Dock Products, Inc., Sussex, WI (US)

(21) Appl. No.: 08/747,873

(22) Filed: Nov. 13, 1996

Related U.S. Patent Documents

Reissue of:
(64) Patent No.: 5,042,103
Issued: Aug. 27, 1991
Appl. No.: 07/487,892
Filed: Mar. 6, 1990

U.S. Applications:

(63) Continuation of application No. 08/532,415, filed on Sep. 22, 1995, now abandoned.

(30) Foreign Application Priority Data

Oct. 1, 1990 (NL) ..... 8900557

(51) Int. Cl.
*E01D 1/00* (2006.01)

(52) U.S. Cl. ..... 14/71.7
(58) Field of Classification Search ..... 14/69.5, 14/71.1, 71.3, 71.5, 71.7; 254/93 HP; 105/243; 298/1 A, 22 R; 414/469
See application file for complete search history.

(56) References Cited

U.S. PATENT DOCUMENTS

| | | | | |
|---|---|---|---|---|
| 1,421,901 A | * | 7/1922 | Brotsch, Jr. | 404/27 |
| 1,868,935 A | | 7/1932 | Breneman | |
| 2,070,960 A | | 2/1937 | Phillips | |
| 2,495,092 A | | 1/1950 | Cox et al. | |
| 2,610,824 A | | 9/1952 | Grier | |
| 2,689,965 A | | 9/1954 | Fenton | |
| 2,804,118 A | | 8/1957 | Bayerkohler | |

(Continued)

FOREIGN PATENT DOCUMENTS

| | | | |
|---|---|---|---|
| AU | 579830 | * | 12/1988 |
| AU | 588734 | * | 1/1989 |
| DE | 1 207 221 | | 12/1965 |
| DE | 2 354 388 | | 5/1974 |
| DE | 27 21 384 | | 11/1978 |
| DE | 3407496 A1 | | 9/1984 |
| DE | 3743551 | | 7/1989 |
| EP | 0 001 316 | | 4/1979 |
| GB | 835142 | | 5/1960 |
| GB | 930163 | | 7/1963 |
| GB | 2 145 041 | | 3/1985 |
| GB | 2 206 158 | | 12/1988 |
| NL | 7710543 | * | 9/1977 |
| SU | 161243 | | 7/1964 |
| SU | 931701 | | 5/1982 |
| SU | 1362826 | | 12/1987 |
| WO | 90/11204 | | 10/1990 |
| WO | 93/13267 | | 7/1993 |

OTHER PUBLICATIONS

Kelley Dyna–Load Mechanical Dockleveler Installation Instruction and Owners Manual dated May 10, 1978—2 pages.*

(Continued)

*Primary Examiner*—Meredith Petravick
(74) *Attorney, Agent, or Firm*—Michael Best & Friedrich LLP

(57) ABSTRACT

The invention concerns a loading bridge for making a connection between a loading platform and a vehicle, wherein the height of the bridge is variable at the side of the vehicle to allow for vehicles with different heights. A gas-operated driving mechanism is disclosed of which the costs are considerably less than prior art hydraulic driving mechanisms. Further a mechanism is disclosed for automatically controlling the movements of a lid connected with the loading bridge.

3 Claims, 4 Drawing Sheets

Figures 1, 3:
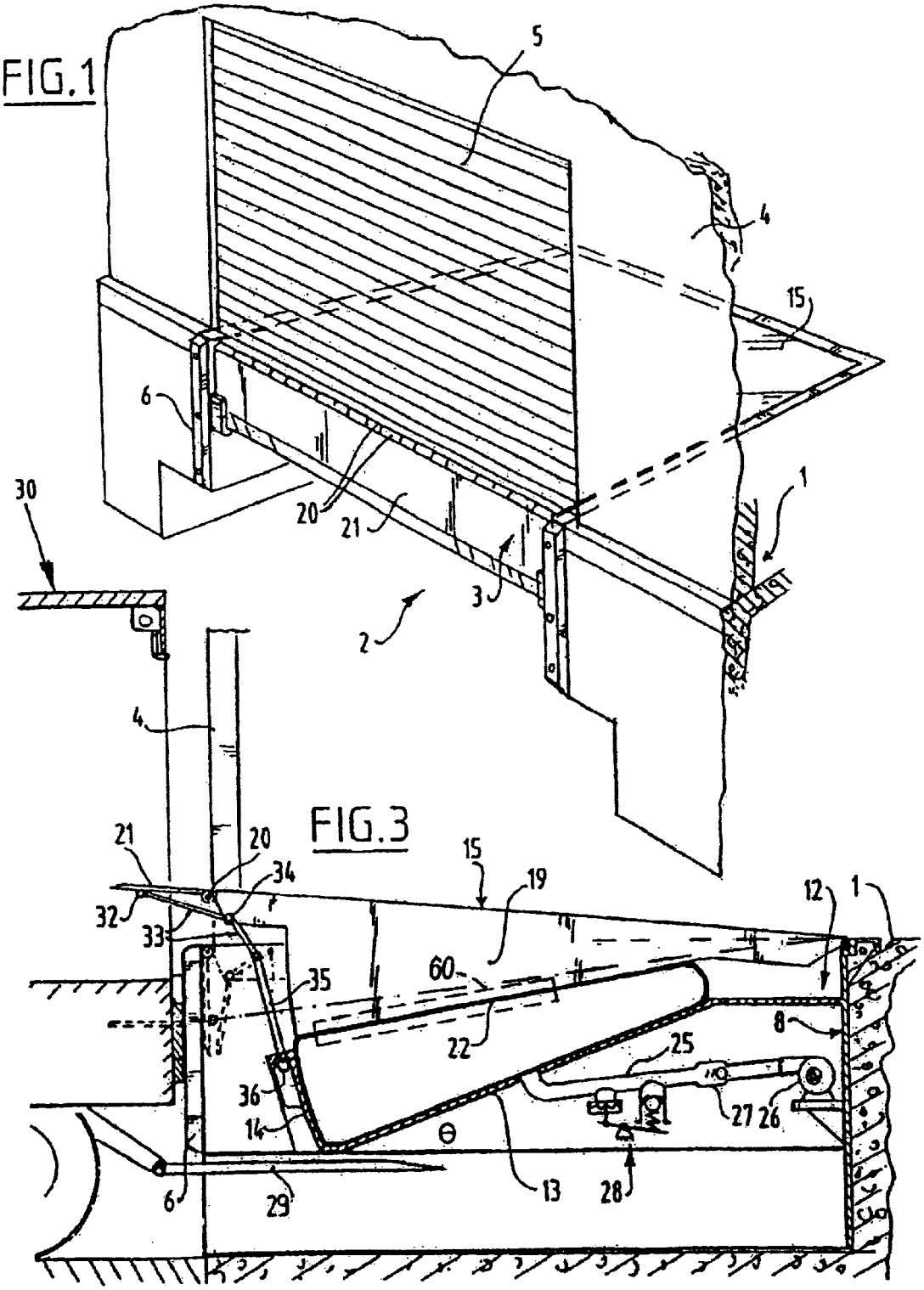

U.S. PATENT DOCUMENTS 2,846,703 A * 8/1958 Adley ..... 14/71.7
3,117,332 A 1/1964 Kelley et al.
3,211,425 A 10/1965 Greulich et al.
3,379,411 A 4/1968 Vanderjagt
3,521,861 A 7/1970 Freudenthal et al.
3,528,118 A 9/1970 Smith
3,659,899 A 5/1972 Phillips et al.
3,685,077 A 8/1972 Wiener et al.
3,694,840 A 10/1972 Loblick
3,711,157 A 1/1973 Smock
3,763,514 A * 10/1973 Bishop ..... 14/71.3
3,784,255 A * 1/1974 Smock ..... 298/22 R X
3,799,504 A 3/1974 Vaughen
3,822,861 A * 7/1974 Scott ..... 254/93 HP
3,835,497 A * 9/1974 Smith ..... 14/71.3
3,902,213 A * 9/1975 Pfleger et al. ..... 14/71
3,997,932 A 12/1976 Artzberger
4,012,804 A 3/1977 Catlett
4,036,472 A 7/1977 Orndorff, Jr.
4,060,170 A 11/1977 Walters
4,081,874 A 4/1978 Artzberger
4,118,817 A * 10/1978 Burnham ..... 14/71.3
4,149,469 A 4/1979 Bigler
4,156,974 A 6/1979 Huang
4,238,003 A 12/1980 Hunter
4,293,969 A * 10/1981 Frommelt ..... 14/71.1
4,319,666 A 3/1982 Hunter
4,343,058 A 8/1982 Loblick
4,455,703 A * 6/1984 Fromme et al. ..... 14/71.3
4,470,578 A * 9/1984 Arvidsson et al. ..... 254/2 C
4,572,579 A 2/1986 Saito
4,630,989 A * 12/1986 Davey ..... 14/71.7 X
4,665,579 A 5/1987 Bennett et al.
4,688,760 A 8/1987 Garman et al.
4,722,655 A 2/1988 Bonerb
4,735,457 A 4/1988 Bonerb et al.
4,776,052 A * 10/1988 Delgado et al. ..... 14/71.3
4,782,542 A 11/1988 Sato
4,784,567 A * 11/1988 Hageman et al. ..... 14/71.1 X
4,854,801 A 8/1989 Bonerb
4,861,215 A 8/1989 Bonerb
4,922,568 A 5/1990 Hageman
4,948,107 A 8/1990 Orndorff, Jr.
4,955,923 A 9/1990 Hageman
5,022,809 A 6/1991 Hinson
5,067,774 A 11/1991 Trowland
5,090,773 A 2/1992 Guillaume
5,178,367 A 1/1993 Vaughen
5,232,202 A 8/1993 Watson
5,414,886 A 5/1995 Sust et al.

OTHER PUBLICATIONS

Kelley Dyna–Load Mechanical Dockleveler Installation Instructions and Owner's Manual dated May 10, 1978.

Kelley Dyna–Load Hydraulic Dockleveler Installation Instructions dated Mar. 1, 1980.

RITE–HITE, Hinged–Lip Adjustable Dock Levelers, Industry's First Mechanical Dock Leveler Bulletin No. HLB–68–2, undated.

Kelley Loading Dock Accessories 1983.

* cited by examiner

MOVABLE LOADING BRIDGE HAVING AN INFLATABLE FLEXIBLE BODY

Matter enclosed in heavy brackets [ ] appears in the original patent but forms no part of this reissue specification; matter printed in italics indicates the additions made by reissue.

*Application Ser. No. 09/598,785, filed Jun. 20, 2000, expressly abandoned, is a continuation of this reissue application which is a continuation of application Ser. No. 08/532,415, filed Sep. 22, 1995, now abandoned.*

The present invention relates to a bridge for making a connection between a loading platform and a vehicle, wherein the bridge is hingedly connected to the platform, and wherein the height *of the bridge* at the side of the vehicle is variable.

Such loading bridges are generally known. Often these loading bridges are driven for their vertical movement through a hydraulic apparatus. In such devices, *a* cylinder is provided between a fixed point and a point [of] *on* the bridge, so that the loading bridge can be moved in the vertical direction and can even be locked.

Also, loading bridges are known[,] which are operated by hand, and which rest at the movable side on the loading floor of the vehicle.

All *of* these known loading bridges have a number of disadvantages[;]. *For example,* manually operated loading bridges can only be applied until a certain weight, as otherwise they become too heavy and cannot be moved by human power.

Big loading bridges, which often comprise a hydraulic drive, have the disadvantage[,] that these hydraulic [apparatus] *devices* are rather costly, [so that] *thereby making* the price of such loading bridges [is] substantial. The same disadvantage [does] also [exist] *exists* when the loading bridge is driven by an electric motor and a rack and pinion.

The present invention [tries to provide] *provides* such a loading bridge, which can be provided with a driving mechanism for *a* relatively modest cost, despite *its* substantial dimensions.

This aim is achieved, in that under the bridge a flexible body has been provided of which the volume *of the flexible body* increases when it is filled with a gas.

As the price of such [as] *a* flexible body is modest, and the filling thereof requires only *low priced* equipment[, of which the price is low], a rising mechanism for such a bridge is provided, which can be manufactured [against] *for a* modest [costs] *cost*. Thus the cost of such a loading bridge [are] *is* decreased considerably. In this respect, the remark is made[,] that the bridge only has to be lifted in its unloaded condition[; hence]. *Hence* there is no need for substantial power, so that *a* relatively light and simple pneumatic apparatus is satisfactory.

Figure 2:
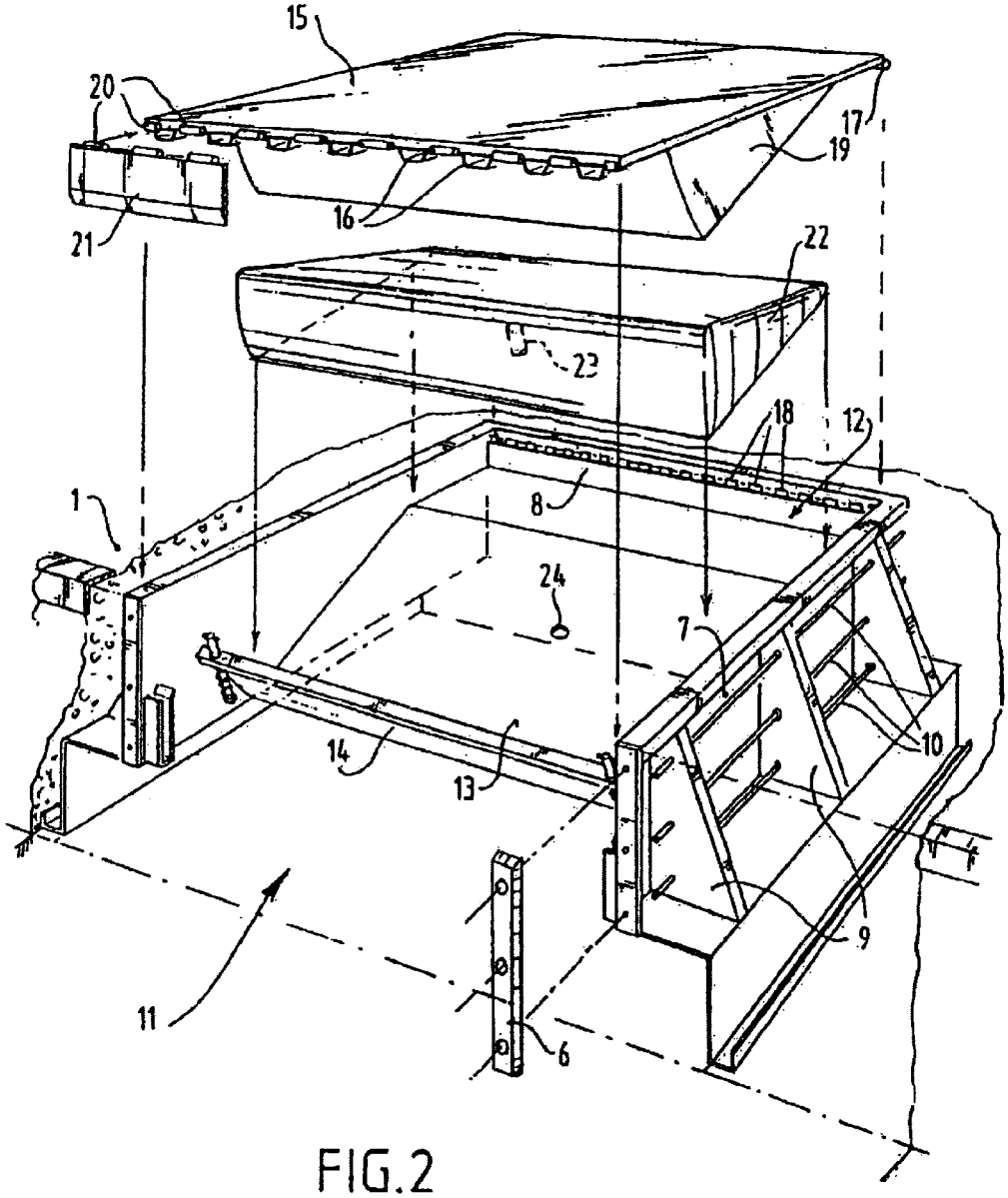
Figure 4:
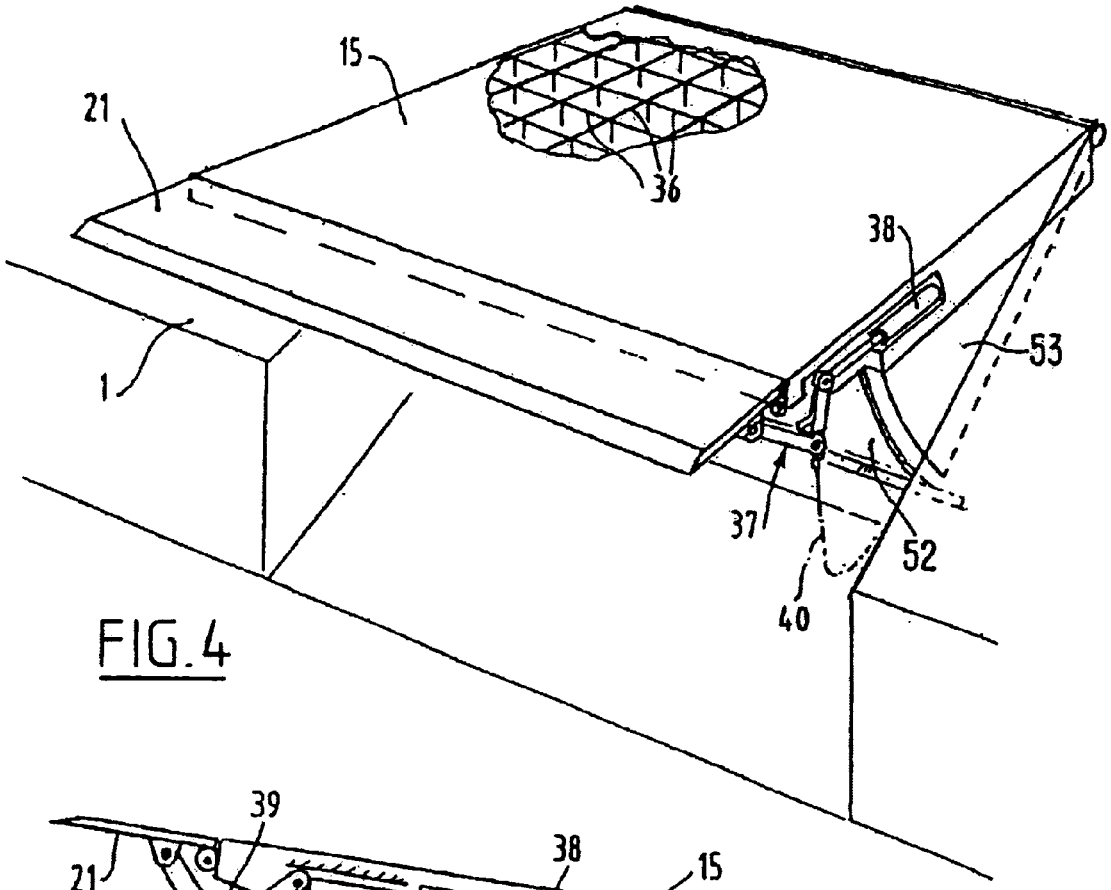
Figure 5:
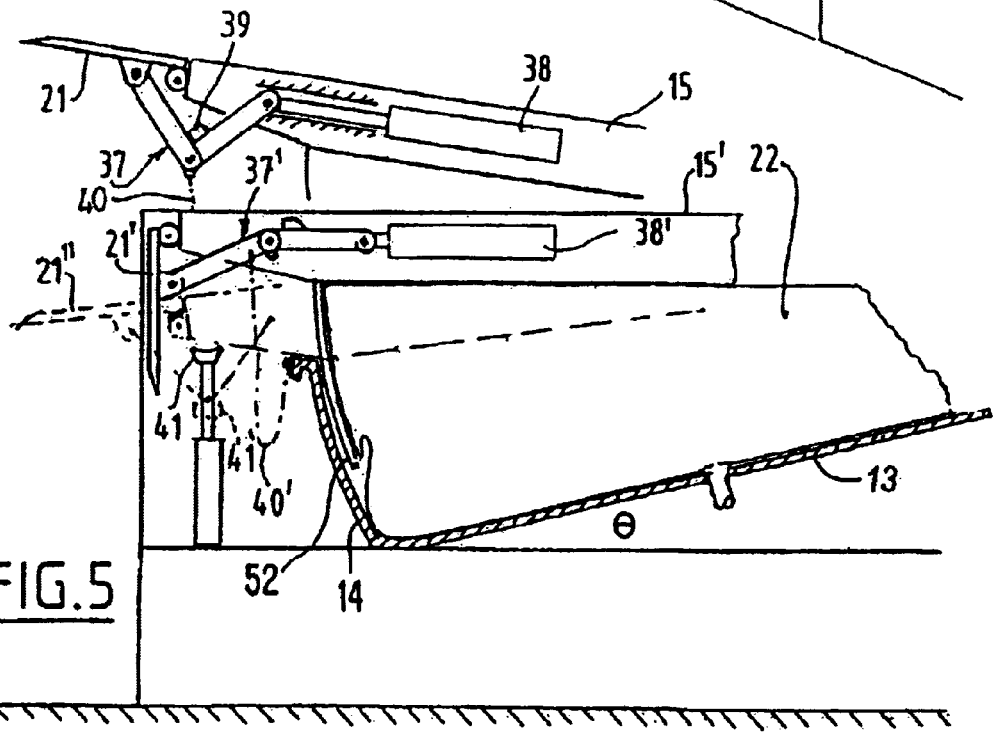
Figure 6:
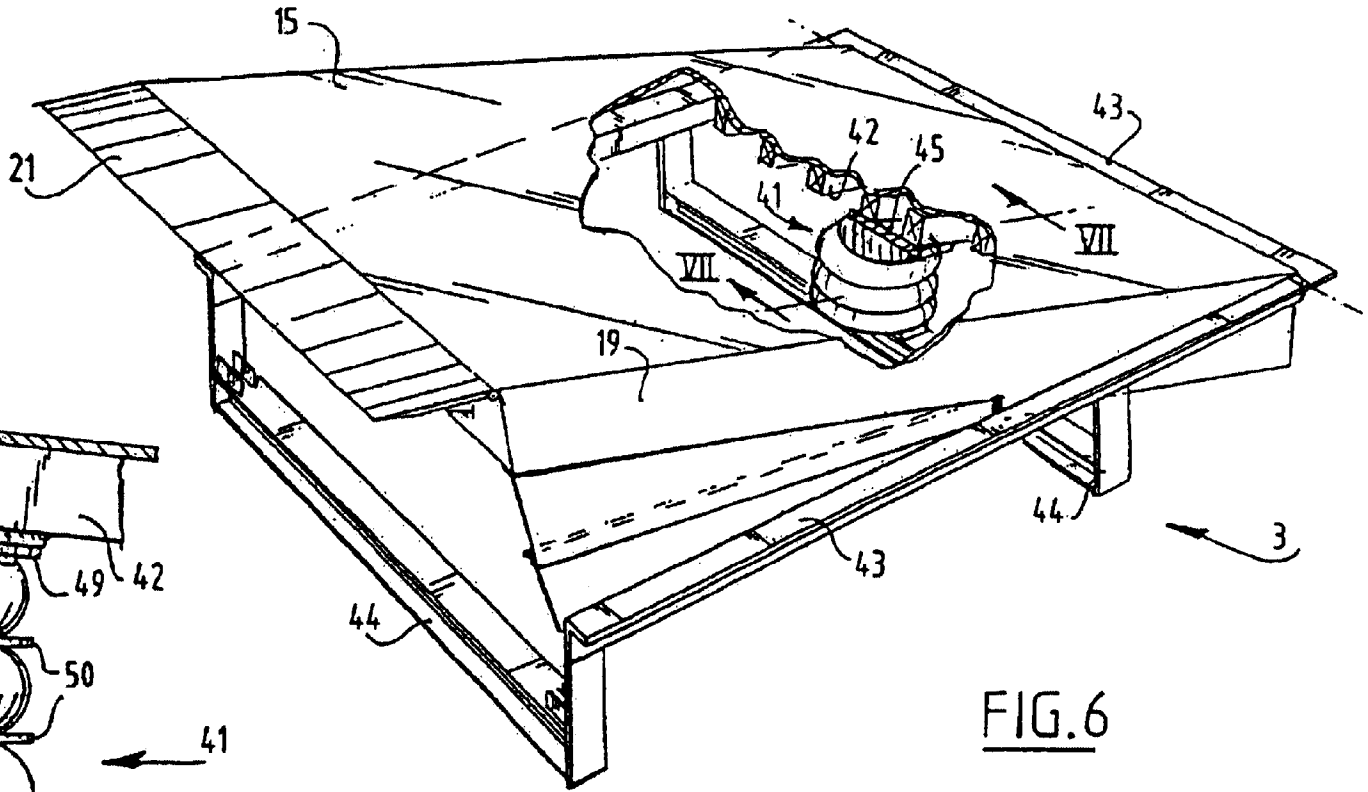
Figure 7:
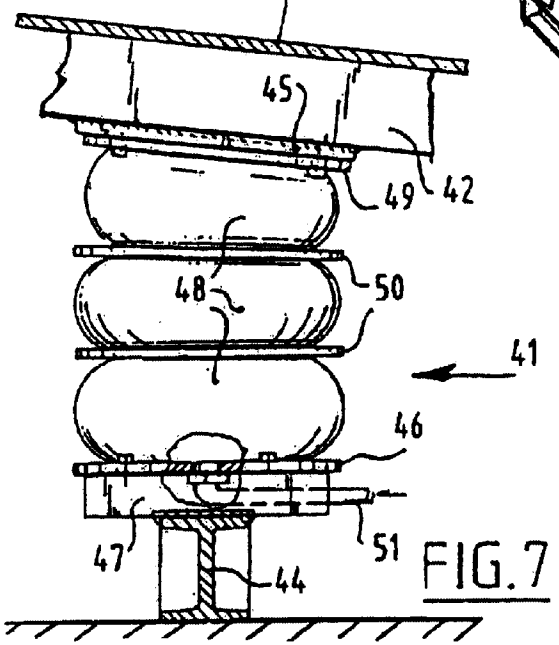

Subsequently, the present invention will be elucidated with the help of the accompanying drawings, wherein:

FIG. 1: is a schematic perspective view of a closed loading platform comprising a loading bridge;

FIG. 2: is a schematic exploded view of a first embodiment of a loading bridge according to the present invention;

FIG. 3: is a schematic cross-sectional view of the first embodiment of a loading bridge according to the present invention;

FIG. 4: is a schematic perspective view of a second embodiment of a loading bridge according to the present invention;

FIG. 5: is a cross-sectional view of an alternative embodiment for the controlling mechanism of the lid of the loading bridge according to the present invention; and FIG. 6: is a perspective view partially broken away of a third embodiment of the present invention; and FIG. 7: is a cross-sectional view, partially as a side view of the embodiment depicted in FIG. 6.

The loading platform 1 depicted in FIG. 1 comprises a pit 2, in which a loading bridge 3 has been provided. In the present case the loading platform 1 is covered[, i.e. that] *by* a wall 4 [has been provided, wherein] *and* a roll down shutter 5 *which* has been provided *in the wall* at the location of the loading bridge 3.

A vehicle to be loaded, for instance a lorry, drives with its rear side as close as possible against the loading platform 1, wherein the rear side of the lorry hits the buffer 6. Then the roll down shutter 5 is moved upwardly, and the height of the loading bridge 3 is adapted to the height of the rear side of the lorry, so that [this] *the lorry* can be loaded easily. It is convenient to drive into the lorry from the loading platform with for instance fork lifts.

FIG. 2 shows an exploded view of such a loading bridge according to the present invention. The loading bridge comprises a housing, which is composed of two fixed sides 7, which have been folded zigzag-wise, and also a rear wall 8. The rear wall comprises reinforcement pieces 9, which are mutually connected through bars 10. When providing such a loading bridge in a loading platform, the loading bridge is located as a whole [on the right spot] *in a desired position*, after which the loading platform is formed in concrete. Thus the sides 7, the rear wall 8, the reinforcement pieces 9 and the bars 10 function as a lost formwork.

[Into the] *The* housing [thus obtained] *supports* a base 11 [is provided], which comprises a substantially horizontal part 12 and a part 13 extending obliquely downward to the front *at an angle* θ *of about twenty-two degrees* (*See FIG. 3*). *Angle* θ *as illustrated in FIG. 5 is about fifteen degrees*. Also, the bottom *of the base 11* comprises a front wall 14 extending obliquely upwardly. The loading bridge per se comprises a movable plate 15, which is manufactured of steel or aluminum[: and to the lower side thereof reinforcement]. *Reinforcement* ribs 16 have been welded *to the lower side of the loading bridge*. Further, a round rod 17 has been welded to the under side of the plate 15, which rests in an array of substantially L-shaped hooks 18 welded against the back wall 8. Finally, a filling piece 19 has been welded against the lower side of the plate 15[, which]. *The* filling piece 19 can be manufactured from a steel box or may be composed of rather light material, like tempex.

At the lower side of the plate 15, a lid 21 has been hingedly connected by means of hinges 20.

In the space between the [falling] *filling* piece 19 and the oblique part 13 of the [bottom] *base 11*, a flexible bag or bellows 22 has been provided, which may be manufactured from for instance polyethylene. The form of this bag is such that it fits in the space thus provided. Further, this bag comprises a connection 23, which fits into a hole 24 provided in the bottom. Through this connection a gas, for instance air, can be supplied[, and] which can fill the bag 22, so that the bridge 15 is [rasied] *raised* thereby.

The cross-sectional view shown in FIG. 3 shows how the bag 22 is locked up in the space between the [olique] *oblique* part 13 of the bottom and the filling piece 19. The bag may be connected with the lower side of the filling piece by for instance adhesive or buttons *60*. Further, it is shown how a ventilator 26 can blow up the bag 22 through a tube 25 against the spring pressure of a one-way valve 27. Further, a valve 28 with pressure dependent action has been provided in the tube, which lets a part of the air flow out when the pressure in the bag becomes too high, so that the loading bridge under a changing load, for instance the driving on and off a fork lifter, does not suddenly jump upwardly. Instead of a ventilator, a compressor with a venturi can be used.

Further in the drawing, it is shown how the vehicle lift 29 can be moved from a lorry 30 [until under] *to* the space under the apparatus, so that it does not interfere the loading and unloading. To avoid wear of the bag during the movement *of the loading bridge*, the front wall 14 thereof is formed such, that the bag wall rolls off or on, when moving the loading bridge. The same feature has been applied with the side walls[; the]. *The* wall of the bag rolls as a membrane on or off against the side wall 19. Besides [these] *this, the* side walls 19 serves to protect the bag[.] 22 in the highest position of the loading bridge.

Further, it is shown in this figure how the lid 21, which is [connnected] *connected* with the bridge 15 by means of a hinge 20, is provided [of] *with* a rod mechanism 31[, that provides for the fact, that the]. *The* lid 21 is usually in its inward position, whereas when reaching the highest position of the loading bridge the rod mechanism forces the lid upwardly, so that this is in the position shown with drawn lines in the figure, after the loading bridge may descend until the position, in which this connects on the loading floor of the lorry 30, and rests on the frame of the lorry or on the loading floor thereof. The lid 21 is kept in this position by a cam 32 welded thereon by a folded rod 33, which is connected with the loading bridge 15 by means of a hinge 34, and a rod 35 connected hingedly with the other side thereof[, which]. *The* rod [comprises a thickening] *35 thickens* 36 at its lower side. [Further this] *The* rod 35 extends through an [apetture] *aperture* in the front plate 14.

When reaching the upper position of the loading bridge, the thickening 36 in the rod 35 exerts a force to the folded rod 33, so that *the folded* rod *33* moves the lid 21 to its extended position. This position is maintained by the cam 32 when [moving] *the loading bridge moves* downwardly.

In FIG. 4, another embodiment of the loading bridge is shown, in which another plate 15 of the loading bridge[.] *is supported by* a network of thin metal strips 36 [have been provided, so that] *forming* a honeycomb-like structure [develops]. This results in a lighter construction of the reinforcement of the loading bridge, which may considerably reduce the costs thereof. This construction is only allowed [becuase] *because* the forces of the loading bridge are borne by the whole underside thereof, so that the construction for the concentrating of the forces to one point, which was necessary when using a hydraulic drive, is superfluous. This has of course a very favorable outworking on the price. Further, this loading bridges comprises a rod system 37 and a spring 38, which also provides that during the descending only of the loading bridge the lid 21 is in its extended position. Further, the bag can be made so large, that [is] *it* pushes directly against the lower side of the bridge and makes the filling piece superfluous.

In this embodiment, a front skirt 52 and side skirts 53 [are provided extending] *extend* downwardly [form] *from* the underside of the bridge. When the bag is deflated, it is folded within the front and side skirts, and the front skirt is adjacent the front wall 14. As the bag is inflated, side portions of the bag are played out off of the skirts onto the front wall and the side walls of the housing.

This is further elucidated with the help of FIG. 5. When moving upwardly, the compression spring 38 will urge the rod system 37 outwardly, which is avoided by the cam 39. When the bridge has reached its highest position, the chain 40 will [pulll] *pull* the rod system 37 downwardly and outwardly, so that the lid 21 is urged to its extended position. During the [following the] descending of the bridge, the rod system 37 will be received by a top 41, which urges the rod system and the spring 38 back to their original positions.

Of course, a lot of other possibilities are available for the controlling [of] the lid 21.

In the embodiment of the loading bridge depicted in [FIG.] *FIGS.* 6 and 7, the bag 22 has been replaced by a bellows 41, *such as an air spring*.

[Besides the] *The* construction of this embodiment of the loading bridge 3 is substantially equal to the embodiment depicted in [FIG.] *FIGS.* 1–3. The present embodiment is different, because *no bag exists and therefore* no housing[.] in which the bag 22 is enclosed[, as there is no question anymore of a bag] *is necessary*. The only reason for nevertheless applying a full housing is the use thereof as lost formwork. This is of course also possible together with the application of a bellows.

[Instead thereof a] *A* frame 43 is used, of which the plate 15 of the loading bridge is provided hingedly, in a way substantially as in the first embodiment. For bearing the load of the frame on the base, two brackets 44 have been provided. Further, in this embodiment, the plate 15 is reinforced by spars 42. The bellows rests with its bottom on the horizontal part of the bracket 44, whereas the top thereof is connected with a plate 45, being connected with the two middle spars 42.

Further the side wall of *the* loading bridge is composed of plates 19, which avoid[.] that part of the body [become] *that becomes* squeezed between the frame and the bridge.

[Besides the] *The* construction of the [bellow] *bellows* is depicted in FIG. 7. The bellows 41 comprises a bottom plate 46, which is connected on the horizontal part 44 through an intermediate piece 47. The bellows per se, which is composed of a flexible bag 48, for instance made of rubber or of plastic, is connected with the base plate 46 and a top plate 49. To avoid extension of the bag 48 in the horizontal direction, two rings 50 [ve] *have* been provided.

Through a pipe 51[.] extending through the intermediate piece 47 and the base plate 46, a gas, for instance air, can be supplied to make the volume of the bag 48 increase. In view of the supply of air or a gas [referred is], *refer* to the embodiment described with the help of FIG. 3.

[Besides several] *Several* features of the different embodiments can be mutually combined.

I claim:

[1. Loading bridge for making a connection between a loading platform and vehicle, comprising:

a substantially planar member pivotally connected to the loading platform and capable of bearing a load, wherein a rear edge portion of said substantially planar member is hinged along a surface of the loading platform, and wherein a front edge is movable in a direction perpendicular to said surface of the loading platform; and pivot means for pivoting said substantially planar member, said pivot means comprising an inflatable flexible body.]

[2. A loading bridge as claimed in claim 1, wherein said pivot means further comprises means for filling said inflatable flexible body with air.]

[3. A loading bridge as claimed in claim 1, wherein said flexible body is a bag made of polyethylene which covers a substantial portion of a bottom surface of the substantially planar member.]

[4. A loading bridge as claimed in claim 1, wherein said flexible body is a bag made of PVC which covers a substantial portion of a bottom surface of the substantially planar member.]

[5. A loading bridge as claimed in claim 1, further comprising a front skirt extending downwardly from a front portion of a bottom surface of the substantially planar member; and first and second side skirts extending downwardly from opposite side portions of the bottom surface of the substantially planar member;

wherein when said flexible body is in a deflated condition said flexible body is stored between said front skirt and said first and second side skirts in a folded fashion, and wherein as said flexible body is inflated side portions of said flexible body are played out from the skirts onto a housing of the loading platform.]

[6. A loading bridge as claimed in claim 1, wherein said flexible body is a bellows having a rigid bottom and rigid top, and wherein said rigid top is connected to a bottom surface of the substantially planar member.]

[7. A loading bridge as claimed in claim 6, wherein said bellows is a air spring.]

[8. A loading bridge as claimed in claim 1, wherein the loading platform has a recess and a housing formed in a bottom portion of said recess, wherein said substantially planar member is disposed within said recess, and wherein said flexible body is disposed within said housing.]

[9. A loading bridge as claimed in claim 1, further comprising a lid hingedly connected to the front edge of said substantially planar member.]

[10. A loading bridge as claimed in claim 9, wherein when said loading bridge is in a loaded condition said substantially planar member is supported on the vehicle by said lid.]

[11. A loading bridge as claimed in claim 9, further comprising control means for controlling movement of said lid, wherein said lid is controlled to an upward position during upward movement of the substantially planar member.]

*12. Loading bridge for making a connection between a loading platform and vehicle, comprising:*

*a substantially planar member pivotally connected to the loading platform and capable of bearing a load, wherein a rear edge portion of said substantially planar member is hinged along a surface of the loading platform, and wherein a front edge is movable in a direction substantially perpendicular to said surface of the loading platform;*

*a base positioned under said planar member;*

*pivot means for pivoting said substantially planar member, said pivot means comprising an inflatable flexible body; and*

*means for inflating said inflatable flexible body, said means for inflating including a ventilator positioned under said base.*

*13. A loading bridge as claimed in claim 12, wherein said base includes a hole for allowing communication between said inflatable flexible body and said ventilator.*

*14. A loading bridge as claimed in claim 12, wherein said inflatable flexible body includes an opening in a bottom portion for allowing communication with said ventilator.*

* * * * *